United States Patent
Xie (10) Patent No.: US 9,806,858 B2
(45) Date of Patent: Oct. 31, 2017

(54) METHOD AND APPARATUS FOR CONTROLLING LENGTH OF AGGREGATION FRAME IN WIRELESS NETWORK

(71) Applicant: Spreadtrum Communications (Shanghai) Co., Ltd., Zhangjiang, Shanghai (CN)

(72) Inventor: Xin Xie, Shanghai (CN)

(73) Assignee: SPREADTRUM COMMUNICATIONS (SHANGHAI) CO., LTD., Zhangjiang, Shanghai (CN)

( * ) Notice: Subject to any disclaimer, the term of this patent is extended or adjusted under 35 U.S.C. 154(b) by 249 days.

(21) Appl. No.: 14/677,210

(22) Filed: Apr. 2, 2015

(65) Prior Publication Data

US 2016/0037515 A1    Feb. 4, 2016

(30) Foreign Application Priority Data

Aug. 1, 2014    (CN) .......................... 2014 1 0378177

(51) Int. Cl.
| | | |
|---|---|---|
| *H04L 5/00* | (2006.01) | |
| *H04L 1/00* | (2006.01) | |
| *H04L 1/20* | (2006.01) | |
| *H04L 1/16* | (2006.01) | |

(52) U.S. Cl.
CPC .......... *H04L 5/0005* (2013.01); *H04L 1/0007* (2013.01); *H04L 1/20* (2013.01); *H04L 5/0055* (2013.01); *H04L 1/1607* (2013.01)

(58) Field of Classification Search
CPC ....... H04L 1/0007; H04L 1/1607; H04L 1/20; H04L 5/0055; H04L 5/0005; H04L 5/001; H04L 5/006; H04W 72/0446; H04W 72/08; H04W 72/082
See application file for complete search history.

(56) References Cited

U.S. PATENT DOCUMENTS

| | | | | |
|---|---|---|---|---|
| 8,346,174 | B2 * | 1/2013 | Nallapureddy | ......... G01S 7/021 324/76.11 |
| 8,666,319 | B2 * | 3/2014 | Kloper | .............. H04W 74/0808 455/63.1 |
| 2005/0152359 | A1 * | 7/2005 | Giesberts | .............. H04L 1/0083 370/389 |

(Continued)

*Primary Examiner* — Edan Orgad
*Assistant Examiner* — Nourali Mansoury
(74) *Attorney, Agent, or Firm* — Cantor Colburn LLP (57) ABSTRACT

Method and apparatus for controlling length of aggregation frames in a wireless network is provided. The method includes: obtaining a noisy level of a channel based on the number of first data received by a first terminal in a first period, the first terminal being a STA or AP in the wireless network, and the first data include aggregation frames or non-aggregation frames; and determining length of an aggregation frame to be transmitted by the first terminal in a second period based on the noisy level, where the second period is following and adjacent to the first period along a time axis. The first terminal may detect the noisy level and select the length of the aggregation frame based on the noisy level. Thus, inter-frame collision and interference in the channel may be reduced, channel resources may be well utilized, and a throughput rate may be improved in real time.

17 Claims, 4 Drawing Sheets

(56) References Cited

U.S. PATENT DOCUMENTS

| | | | |
|---|---|---|---|
| 2007/0053354 A1* | 3/2007 | Rudolf | H04L 9/0833 370/389 |
| 2007/0280181 A1* | 12/2007 | Matsuo | H04L 1/0002 370/338 |
| 2008/0130538 A1* | 6/2008 | Raissinia | H04W 28/06 370/310 |
| 2014/0105143 A1* | 4/2014 | Lee | H04W 74/0816 370/329 |
| 2014/0126559 A1* | 5/2014 | Lynch | H04L 49/901 370/338 |

* cited by examiner

METHOD AND APPARATUS FOR CONTROLLING LENGTH OF AGGREGATION FRAME IN WIRELESS NETWORK

CROSS-REFERENCE TO RELATED APPLICATIONS

The present invention claims priority under 35 U.S.C. §119 to Chinese patent application No. 201410378177.5, filed on Aug. 1, 2014, the entire content of which is incorporated herein by reference.

FIELD OF THE DISCLOSURE

The present disclosure generally relates to communication technology field, and more particularly, to a method and an apparatus for controlling length of aggregation frames in a wireless network.

BACKGROUND OF THE DISCLOSURE

Institute of Electrical and Electronics Engineers (IEEE) 802.11 is a set of air interface specifications in wireless local area network developed for Dedicated Short Range Communication (DSRC) by IEEE Committee, which provides wireless network service based on a competition scheme. In IEEE 802.11 wireless network, before transmitting a data packet, a station (STA) or an access point (AP) needs to monitor a channel to determine whether the channel is clear, and if yes, experience a random back-off process. Or else, the STA or AP cannot transmit the data packet and needs to monitor the channel again. Sometimes, when the channel is determined to be clear, data packets are transmitted. However, there is a chance that some data packets which are actually being transmitted in the particular channel may be mis-detected or not be detected because another STA or AP which is transmitting these data packets is far away and has a low power. That is to say, the channel, which is determined to be clear by the particular STA or AP, is actually noisy. As a result, inter-frame collision may occur among the data packets transmitted by multiple STAs or APs, which causes invalid packet transmission.

A packet aggregation function has been involved in IEEE 802.11n and IEEE802.11ac, which enables a lengthened aggregation frame formed by a plurality of aggregation sub-frames to be transmitted in a channel.

For example, an aggregation-media access control service data unit (A-MSDU) frame aggregates multiple media access control service data units (MSDUs). These MSDUs share the same media access control (MAC) frame head and the same frame check sequence (FCS). The FCS is used in a check process. As the aggregation frame has one unified FCS, once an error in the transmission of any one of the MSDUs occurs, reception of the whole A-MSDU frame at a receiver will be invalid, and then the receiver may require the SAT or AP to retransmit the A-MSDU frame. For an aggregation-media access control protocol data unit (A-MPDU) frame, it aggregates multiple media access control protocol data units (MPDUs). Each MPDU in the A-MPDU frame has an independent FCS. When a FCS collides with a frame head of a physical layer protocol data unit (PPDU) which corresponds to the A-MPDU, the reception of the A-MPDU may fail.

The packet aggregation function can improve data packet transmission ability in a wireless local area network and a throughput rate of a channel. In an aggregation frame, the more sub-frames are aggregated, the longer the aggregation frame to be transmitted becomes. However, the wireless transmission environment is generally complicated, thus the length of an aggregation frame needs to be carefully configured to reduce the possibility of inter-frame collision and interference among different STAs or APs in a wireless channel.

SUMMARY

In one embodiment of the present disclosure, a method for controlling length of aggregation frames in a wireless network is provided, including: obtaining a noisy level of a channel based on the number of first data received by a first terminal in a first period, where the first terminal is a STA or an AP in the wireless network, and the first data include aggregation frames or non-aggregation frames; and determining length of an aggregation frame to be transmitted by the first terminal in a second period based on the noisy level of the channel, where the second period is following and adjacent to the first period along a time axis. In embodiments of the present disclosure, the number of the first data received by the first terminal represents how many first data are received by the first terminal, which may be calculated by frames.

Optionally, the noisy level of the channel may decrease with the increment of a first ratio calculated based on Equation (1), $$A = C/B \qquad (1)$$

where A represents the first ratio, B represents the number of the first data received by the first terminal in the first period, and C represents the number of a first set of data among the first data received by the first terminal in the first period, where each MAC target address of the first set of data is the first terminal.

Optionally, the length of the aggregation frame may decrease with the increment of the noisy level of the channel.

Optionally, the noisy level of the channel may be determined based on a norm of the noisy level of the channel, and the norm of the noisy level of the channel is determined by: obtaining a first number, where the first number represents the number of PPDUs received by the first terminal in the first period; obtaining a second number, where the second number represents the number of Acknowledgement (ACK) frames or block ACK frames received by the first terminal in the first period; obtaining a third number, where the third number is the number of the first data received by the first terminal in the first period which are not ACK frames or block ACK frames and whose MAC target address is the first terminal; and if the difference between the first number and the second number is greater than or equal to a first threshold, determining the norm of the noisy level of the channel based on Equation (2), $$\text{CCA\_Freq} = 1 - \frac{\text{Rx\_MPDU\_Cnt}}{\text{Rx\_PPDU\_Cnt} - \text{Rx\_ACK\_Cnt}} \qquad (2)$$

where CCA_Freq represents the norm of the noisy level of the channel, Rx_PPDU_Cnt represents the first number, Rx_ACK_Cnt represents the second number, and Rx_MPDU_Cnt represents the third number.

Optionally, the method may further include: if the difference between the first number and the second number is less than the first threshold, determining the norm of the noisy level of the channel to be zero.

Optionally, the first threshold may be within a range from 1 to 10.

Optionally, the first period and the second period may be within a range from 100 ms to 500 ms.

Optionally, determining the length of the aggregation frame may include: obtaining the length of the aggregation frame which corresponds to the norm of the noisy level by searching a pre-determined mapping relation, where the mapping relation records relations between norms of the noisy level and lengths of aggregation frames.

Optionally, the length of the aggregation frame may be the number of aggregation sub-frames which constitute the aggregation frame.

Optionally, the aggregation frame may be one selected from A-MPDU, A-MSDU or a combined aggregation frame, where the combined aggregation frame may be a multi-level aggregation frame consisting of MPDU and MSDU.

In one embodiment of the present disclosure, an apparatus for controlling length of aggregation frames in a wireless network is provided, including: a noisy level determination unit, configured to obtain a noisy level of a channel based on the number of first data received by a first terminal in a first period, where the first terminal is a STA or an AP in the wireless network, and the first data include aggregation frames or non-aggregation frames; and an aggregation length determination unit, configured to determine length of an aggregation frame to be transmitted by the first terminal in a second period based on the noisy level of the channel, where the second period is following and adjacent to the first period along a time axis.

In embodiments of the present disclosure, based on the noisy level of the channel obtained in the previous period, the length of the aggregation frame to be transmitted by the first terminal in the next period may be adjusted adaptively. That is, the first terminal may detect the noisy level of the channel, and select the length of the aggregation frame based on the noisy level. The aggregation frame with the selected length may be transmitted in the channel smoothly, causing less inter-frame collision and interference in the wireless channel. The channel resources may be well utilized, and a throughput rate may be improved in real time.

Further, the noisy level of the channel may be effectively detected by using the norm, so that the physical transmission performance of the channel may be reflected more accurately, and further the length of the aggregation frame may be adjusted accordingly. In this way, a suitable length may be selected for the aggregation frame according to the practical state of the channel, which may improve the throughput rate.

DETAILED DESCRIPTION OF THE DISCLOSURE

In existing techniques, length of an aggregation frame cannot be adjusted adaptively based on a noisy level of a wireless channel, which leads to serious inter-fame collision and interference of the wireless channel, a low utilization of wireless channel resources and a low throughput rate.

In an embodiment, a method for controlling length of aggregation frames in a wireless network is provided.

Figure 1:
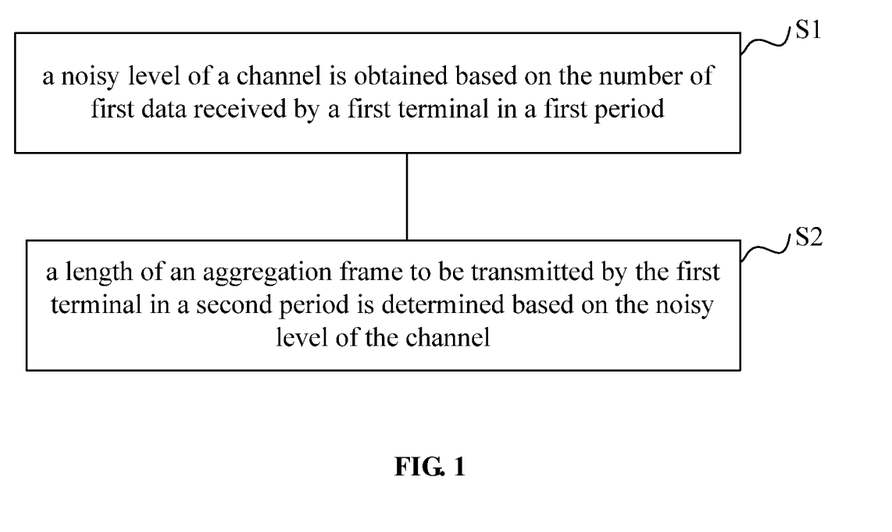
FIG. 1 schematically illustrates a flow chart of a method for controlling length of aggregation frames according to an embodiment of the disclosure.

Referring to FIG. 1, in S1, a noisy level of a channel is obtained based on the number of first data received by a first terminal in a first period.

The first data include aggregation frames or non-aggregation frames. In some embodiments, the aggregation frame may be one selected from A-MPDU, A-MSDU or a combined aggregation frame, where the combined aggregation frame may be a multi-level aggregation frame consisting of MPDU and MSDU. In some embodiments, the non-aggregation frame may be MPDU.

In some embodiments, the first terminal is a STA or an AP in the wireless network.

To control the length of the aggregation frame according to the noisy level of the channel, a time range may be divided into a plurality of time interval sequences, i.e., a plurality of time periods. Based on statistical data of the first data received by the STAs or APs in a current time period, the noisy level of the channel may be determined, and further the length of the aggregation frame may be adjusted accordingly in a time period which is following and adjacent to the current time period based on the noisy level of the channel determined in the current time period.

In some embodiments, the length of the aggregation frame may be the number of aggregation sub-frames which constitute the aggregation frame. The more the sub-frames are aggregated, the longer the aggregation frame becomes.

In embodiments of the present disclosure, the first period is used to represent the current time period the STAs or APs stay, and a second period is used to represent the time period which is following and adjacent to the current time period along a time axis.

In S2, length of an aggregation frame to be transmitted by the first terminal in a second period is determined based on the noisy level of the channel.

The length of the aggregation frame to be transmitted by the first terminal in the second period may be adaptively adjusted according to the noisy level of the channel determined in the first period. In some embodiments, if the noisy level of the channel determined in the first period is relatively high, the length of the aggregation frame may be decreased in the second period; vice versa.

In embodiments of the present disclosure, the length of the aggregation frame to be transmitted by the first terminal may be adaptively adjusted according to the noisy level of the channel. The aggregation frame with the selected length may be transmitted in the channel smoothly, causing less inter-frame collision and interference in the wireless channel. The channel resources may be utilized efficiently, and a throughput rate may be optimized in real time.

In order to clarify the objects, characteristics and advantages of the disclosure, embodiments of present disclosure will be described in detail in conjunction with accompanying drawings.

In some embodiments, the noisy level of the channel in the first time period may be determined, and further the length of the aggregation frame to be transmitted by the first terminal in the second period may be determined based on a pre-determined mapping relation between noisy levels of the channel and lengths of aggregation frames.

In some embodiments, a time may be divided into statistical time interval sequences with an interval of T. A current time interval with the length of T is the first time period, and a time interval which is following and adjacent to the current time interval is the second time period.

To adjust the length of the aggregation frame in the next time period T based on the noisy level of the channel in the current time period T in real time, the time interval T may not be set too long. In some embodiments, the time interval T may be within a range from 100 ms to 500 ms, that is, the first period and the second period may be within a range from 100 ms to 500 ms. In some embodiments, the first period and the second period may be determined further based on practical experiment data, a channel state, and practical requirements. In embodiments of the present disclosure, the first period and the second period may be not limited.

The aggregation frames may be A-MPDUs, A-MSDUs or a combined aggregation frame. The A-MPDU is an aggregation frame aggregated by multiple MPDUs, and each MPDU is called an aggregation sub-frame. The A-MSDU is an aggregation frame aggregated by multiple MSDUs, and each MSDU is called an aggregation sub-frame. The combined aggregation frame is a combination of aggregation frames aggregated by MPDUs and aggregation frames aggregated by MSDUs. For example, multiple MSDUs constitute a MPDU, and multiple MPDUs further constitute an aggregation frame, thus, the aggregation frame is a multi-level aggregation frame consisting of MSDUs and MPDUs, where each MPDU consisting of multiple MSDUs is called an aggregation sub-frame.

In some embodiments, the length of the aggregation frame may be the number of the aggregation sub-frames which constitute the aggregation frame. For example, the length of the A-MPDU aggregation frame may be the number of MPDUs contained in the A-MPDU aggregation frame, or the length of the A-MSDU aggregation frame may be the number of MSDUs contained in the A-MSDU aggregation frame.

Figure 2:
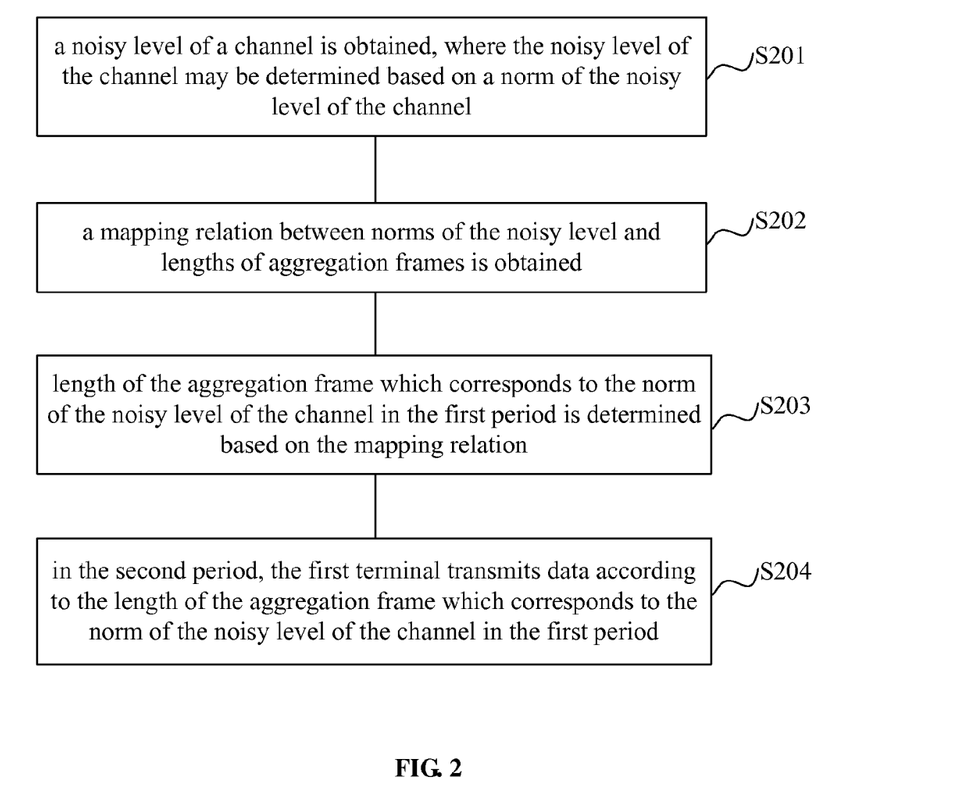
FIG. 2 schematically illustrates a flow chart of a method for controlling length of aggregation frames according to an embodiment of the disclosure.

FIG. 2 schematically illustrates a flow chart of a method for controlling length of aggregation frames according to an embodiment of the disclosure. Referring to FIG. 2, in S201, a noisy level of a channel is obtained, where the noisy level of the channel may be determined based on a norm of the noisy level of the channel.

In some embodiments, the noisy level of the channel may be determined based on the number of first data received by a first terminal in a first period whose MAC target address is the first terminal.

In some embodiments, the noisy level of the channel may decrease with the increment of a first ratio calculated based on Equation (1), $$A = C/B \quad (1)$$

where A represents the first ratio, B represents the number of the first data received by the first terminal in the first period, and C represents the number of a first set of data among the first data received by the first terminal in the first period, where each MAC target address of the first set of data is the first terminal. The greater the first ratio is, the lower the noisy level of the channel is; and vice versa.

Hereinafter, determination of the noisy level of the channel is described in detail in conjunction with a formula.

In some embodiments, the noisy level of the channel may be determined based on the norm of the noisy level of the channel. The greater the norm is, the noisier the channel is.

Figure 3:
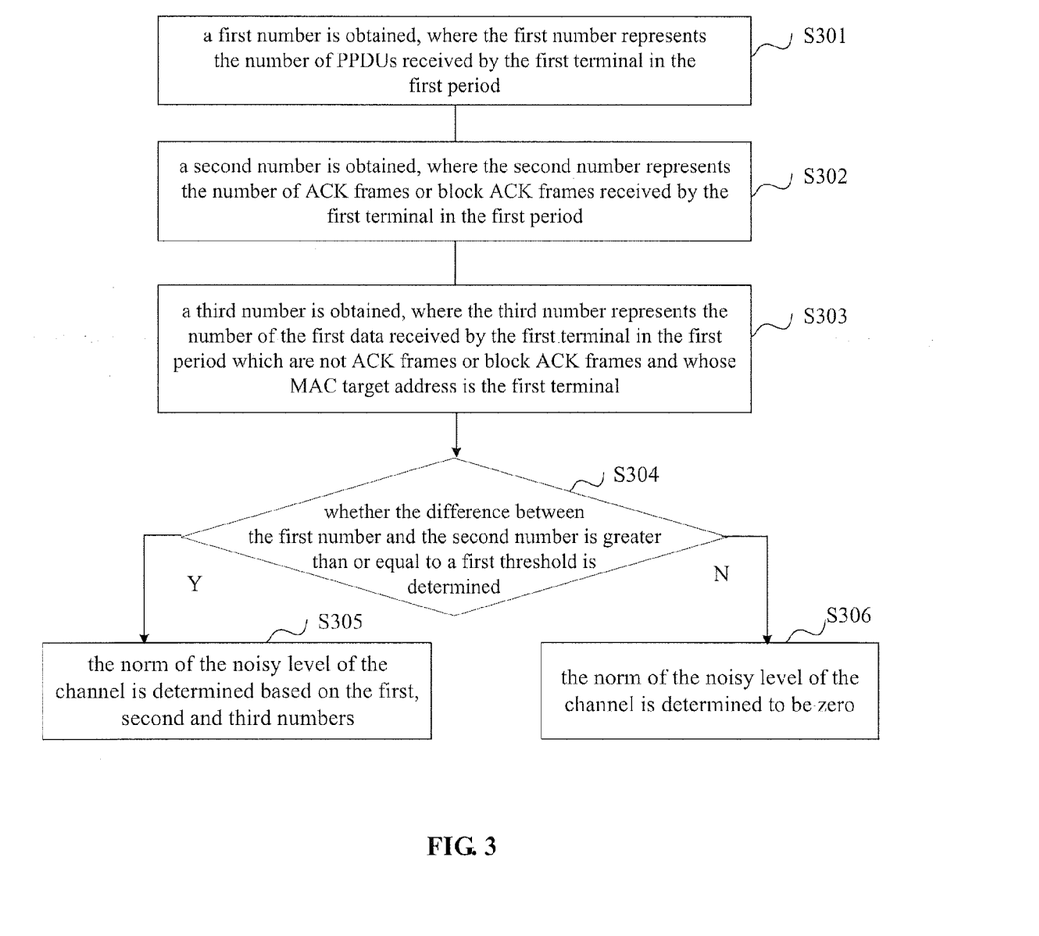
FIG. 3 schematically illustrates a flow chart of a method for determining a norm of a noisy level of a channel according to an embodiment of the disclosure.

FIG. 3 schematically illustrates a flow chart of a method for determining the norm of the noisy level of the channel according to an embodiment of the disclosure. Referring to FIG. 3, S301 to S303 may be performed to obtain related statistical data in determination of the norm of the noisy level of the channel.

In S301, a first number is obtained, where the first number represents the number of PPDUs received by the first terminal in the first period.

The first number is counted and represented by Rx_PPDU_Cnt.

In S302, a second number is obtained, where the second number represents the number of ACK frames or block ACK frames received by the first terminal in the first period.

The second number is counted and represented by Rx_ACK_Cnt.

ACK or block ACK is a message acknowledgement mechanism which is used to ensure the transmission reliability of air interface data.

During a message transmission process, to each IEEE802.11 message transmitted by a sending terminal (for example, the first terminal), a receiving terminal, after receiving it, needs to perform an ACK or block ACK acknowledgement. If receiving the ACK or block ACK acknowledgement, the sending terminal may determine that the message is successfully transmitted and send a next frame; else, the sending terminal may retransmit the message.

In S303, a third number is obtained, where the third number represents the number of the first data received by the first terminal in the first period which are not ACK frames or block ACK frames and whose MAC target address is the first terminal.

The third number is counted and represented by Rx_MPDU_Cnt.

In some embodiments, the first data are aggregation frames, and the third number represents the number of the aggregation frame received by the first terminal in the first period which are not ACK frames or block ACK frames and whose MAC target address is the first terminal. In some embodiments, the first data are non-aggregation frames, and the third number represents the number of the non-aggregation frame received by the first terminal in the first period which are not ACK frames or block ACK frames and whose MAC target address is the first terminal.

The third number may be obtained by using a filtering method based on frame types. For example, frames related to ACK or block ACK acknowledgement mechanisms may be filtered out, and a portion of the remained first data whose MAC target address is the first terminal is counted to obtain the third number.

The first terminal may obtain the first data based on the PPDU received from demodulation in the physical layer and upload the first data to a MAC layer. The first data whose MAC target address is the first terminal may be counted.

Based on the data obtained from S301 to S303, the norm of the noisy level of the channel may be obtained.

It should be noted that, S301 to S303 can be performed in any order to obtain the required statistical data.

After S301, S302 and S303, S304 is performed. In S304, whether the difference between the first number and the second number is greater than or equal to a first threshold is determined.

The first threshold may be determined based on experience data, experiment data and so on.

In some embodiments, the first and second periods are within a range from 100 ms to 500 ms. Based on experiment data, the first threshold may be set to be within a range from 1 to 10. In some embodiments, the first threshold may be determined based on practical experiment data and a state of the channel, and is not limited here.

If the difference between the first number and the second number is greater than or equal to the first threshold, S305 is performed; else, S306 is performed.

In S305, the norm of the noisy level of the channel is determined based on the first, second and third numbers according to Equation (2), $$CCA\_Freq = 1 - \frac{Rx\_MPDU\_Cnt}{Rx\_PPDU\_Cnt - Rx\_ACK\_Cnt} \quad (2)$$

where CCA_Freq represents the norm of the noisy level of the channel, Rx_PPDU_Cnt represents the first number, Rx_ACK_Cnt represents the second number, and Rx_MPDU_Cnt represents the third number.

In S306, the norm of the noisy level of the channel is determined to be zero.

As the first number represents the number of the PPDUs received by the first terminal in the first period, and the second number represents the number of ACK frames or block ACK frames received by the first terminal in the first period, the difference between the third number and the fourth number is the number of PPDUs received by the first terminal in the first period which are not ACK frames or block ACK frames. If the difference therebetween is relatively small, it indicates that the PPDUs received by the first terminal in the first period are almost data packets obtained by ACK or block ACK message acknowledgement mechanisms, and the noisy level of the channel has little interference on the statistic result. Under the message acknowledgement mechanisms, the channel is occupied by the first terminal, thus, the noisy level of the channel may be regarded as zero. That is, if the difference between the first number and the second number is less than the first threshold, the norm of the noisy level of the channel may be considered as zero.

Based on S301 to S306, the norm of the noisy level of the channel in the first period may be obtained.

Referring to FIG. 2, after the norm of the noisy level of the channel is determined in S201, S202 may be performed.

In S202, a mapping relation between norms of the noisy level and lengths of aggregation frames is obtained.

The mapping relation may be pre-determined based on experiment data. By combining practical transmission performance of the channel with the noisy level and the throughput rate, different lengths of aggregation frames may be determined for different norms of the noisy level respectively based on plenty of experiments. In a noisy channel, by using a suitable length of aggregation frames which corresponds to the norm of the noisy level of the channel, wireless channel resource may be well utilized and the throughput rate may be improved effectively.

In some embodiments, according to different rates of the physical layer, different mapping relations between the norms of the noisy level and the lengths of aggregation frames may be determined based on experiment data respectively, so that the length of the aggregation frames which corresponds to a certain norm of the noisy level may be obtained under different rates of the physical layer. In this way, the inter-frame collision and interference may be reduced in the wireless channel and the throughput rate may be improved in real time.

In some embodiments, the different mapping relations are determined for different rates of the physical layer. When the norm of the noisy level of the channel in the first period is obtained, the length of the aggregation frames which corresponds to the obtained norm may be determined by searching one of the different mapping relations which corresponds to the rate of the physical layer in the second period. And the determined length of the aggregation frames may be considered as the length of the aggregation frame to be transmitted by the first terminal in the second period.

In each mapping relation determined for each rate of the physical layer, the noisier the channel is, i.e., the greater the norm of the noisy level is, the smaller the length of the aggregation frames is; the less noisier the channel is, i.e., the smaller the norm of the noisy level is, the greater the length of the aggregation frames is.

For example, based on the mapping relation which corresponds to the rate of the physical layer of the first terminal in the second period, the greater the norm of the noisy level of the channel in the first period is, the smaller the length of the aggregation frame in the second period is, that is, the fewer the sub-frames to be aggregated are. The smaller the norm of the noisy level of the channel in the first period is, the smaller the length of the aggregation frame in the second period is, that is, the more the sub-frames to be aggregated are.

In S203, length of the aggregation frame which corresponds to the norm of the noisy level of the channel in the first period is determined based on the mapping relation.

In some embodiments, according to a packet transmission rate of the physical layer in the first terminal in the second period, the mapping relation which corresponds to the packet transmission rate may be obtained. And further the length of the aggregation frame which corresponds to the norm of the noisy level of the channel in the first period may be determined based on the obtained mapping relation.

In S204, in the second period, the first terminal transmits data according to the length of the aggregation frame which corresponds to the norm of the noisy level of the channel in the first period.

Based on the length of the aggregation frame obtained in S203, data to be transmitted may be aggregated to form aggregation frames, and the aggregation frames are transmitted.

It should be noted that, in above embodiments, the current time period is considered as the first period, and a time period which is following and adjacent to the first period along a time axis is considered as the second period. Based on the norm of the noisy level of the channel in the current period, the length of the aggregation frames in the following and adjacent period may be determined To any time interval on the time axis, the length of the aggregation frames therein can be determined based on the norm of the noisy level of the channel in a previous time interval. Similarly, the norm of the noisy level of the channel in a current time interval can be taken as a base in determination of the length of the aggregation frames in a next time interval. Therefore, the length of the aggregation frames in each time period can be adjusted flexibly to improve the throughput rate in real time.

It should be noted that, in some embodiments, statistical data in the front of a time period may be obtained and used for adjustment in the back-end of the time period, which is also within the scope of the present disclosure.

It should be noted that, in above embodiments, to enable the mapping relation between the norms of the noisy level and the lengths of the aggregation frames to well satisfy the current channel environment, different mapping relations are set according to different rates of the physical layer, so that the length of the aggregation frames to be transmitted may be more suitable for the current channel environment and the throughput rate may be higher. In some embodiments, considering that different rates of the physical layer correspond to different mapping relations, a compromised mapping relation may be employed. That is, a same mapping relation is employed to determine the length of the aggregation frames which corresponds to the current norm of the noisy level of the channel, under any rate of the physical layer. In this way, the throughput rate may be not high enough, but a time for obtaining the length of the aggregation frames may be reduced, thus, the efficiency may be improved. Those skilled in the art can set one mapping relation or different mapping relations according to practical requirements.

In above embodiments, the length of the aggregation frames which corresponds to the norm of the noisy level of the channel in the first period is determined by searching the pre-determined mapping relation, thus, the length of the aggregation frames may be obtained rapidly and accurately based on a practical state of the channel. In some embodiments, the mapping relation may not be set in advance. Instead, the length of the aggregation frames may be set according to following rules. When the norm of the noisy level of the channel is relatively great, the length of the aggregation frames may be set to be relatively small; and when the norm of the noisy level of the channel is relatively small, the length of the aggregation frames may be set to be relatively great.

In above embodiments, by obtaining the norm of the noisy level of the channel, the noisy level of the channel may be detected effectively, and further the length of the aggregation frames in the next period may be adjusted adaptively based on the norm of the noisy level of the channel. Therefore, STAs or APs can detect the noisy level of the channel adaptively, and the length of the aggregation frames can be adjusted automatically, which enables the length of the aggregation frames to be matched with the current practical state of the channel. In this way, the possibility of inter-frame collision and interference in the wireless channel may be decreased effectively, the channel resources may be utilized efficiently, and the throughput rate may be improved in real time.

Figure 4:
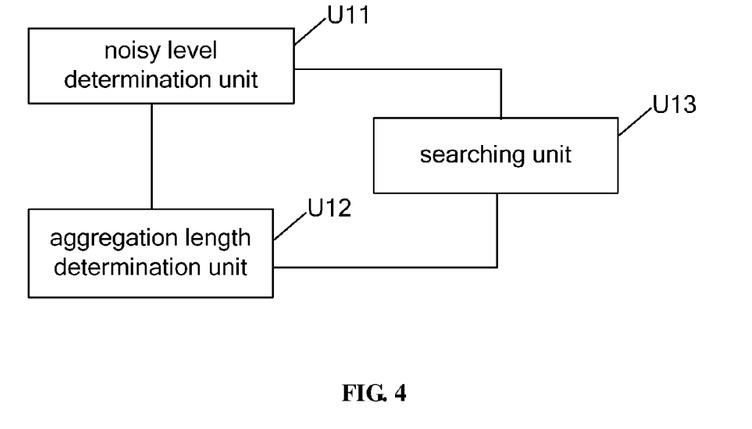
FIG. 4 schematically illustrates a structural diagram of an apparatus for controlling length of aggregation frames according to an embodiment of the disclosure.

Accordingly, in an embodiment, an apparatus for controlling length of aggregation frames in a wireless network is provided. Referring to FIG. 4, the apparatus includes a noisy level determination unit U11 and an aggregation length determination unit U12.

The noisy level determination unit U11 may be configured to obtain a noisy level of a channel based on the number of first data received by a first terminal in a first period, where the first terminal is a STA or an AP in the wireless network, and the first data include aggregation frames or non-aggregation frames.

In some embodiments, the noisy level of the channel may decrease with the increment of a first ratio calculated based on Equation (1), $$A = C/B \quad (1)$$

where A represents the first ratio, B represents the number of the first data received by the first terminal in the first period, and C represents the number of a first set of data among the first data received by the first terminal in the first period, where each MAC target address of the first set of data is the first terminal.

The aggregation length determination unit U12 may be configured to determine length of an aggregation frame to be transmitted by the first terminal in a second period based on the noisy level of the channel, where the second period is following and adjacent to the first period along a time axis.

In some embodiments, the length of the aggregation frame may decrease with the increment of the noisy level of the channel.

In some embodiments, the noisy level determination unit U1f may be configured to determine the noisy level of the channel based on a norm of the noisy level of the channel.

Figure 5:
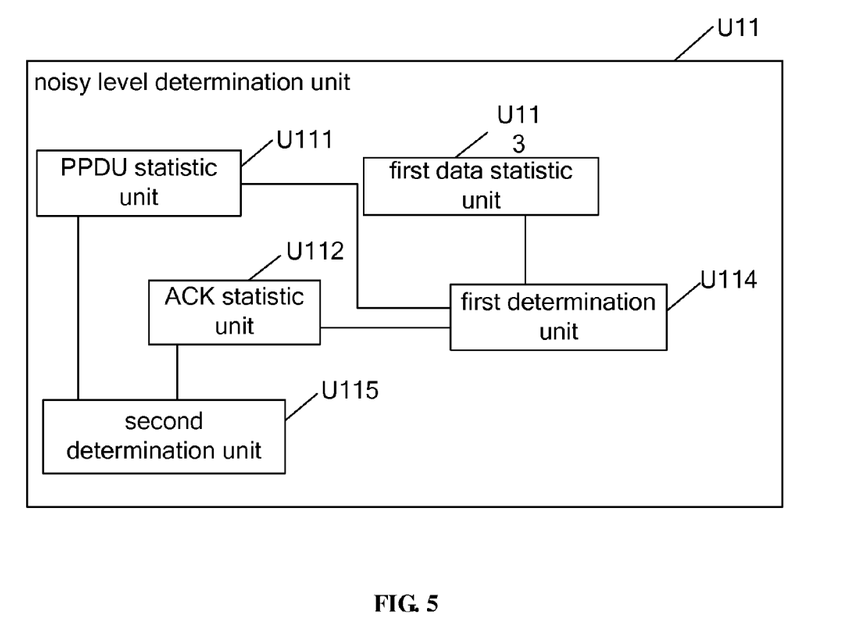
FIG. 5 schematically illustrates a structural diagram of a noisy level determination unit according to an embodiment of the disclosure.

FIG. 5 schematically illustrates a structural diagram of the noisy level determination unit U11 according to an embodiment of the disclosure. Referring to FIG. 5, the noisy level determination unit U11 includes a PPDU statistic unit U111, an ACK statistic unit U112, a first data statistic unit U113 and a first determination unit U114.

The PPDU statistic unit U111 may be configured to: obtain a first number, where the first number represents the number of PPDUs received by the first terminal in the first period.

The ACK statistic unit U112 may be configured to: obtain a second number, where the second number represents the number of ACK frames or block ACK frames received by the first terminal in the first period.

The first data statistic unit U113 may be configured to: obtain a third number, where the third number represents the number of the first data received by the first terminal in the first period which are not ACK frames or block ACK frames and whose MAC target address is the first terminal.

The first determination unit U114 may be configured to: if the difference between the first number and the second number is greater than or equal to a first threshold, determine the norm of the noisy level of the channel based on Equation (2), $$CCA\_Freq = 1 - \frac{Rx\_MPDU\_Cnt}{Rx\_PPDU\_Cnt - Rx\_ACK\_Cnt} \quad (2)$$

where CCA_Freq represents the norm of the noisy level of the channel, Rx_PPDU_Cnt represents the first number, Rx_ACK_Cnt represents the second number, and Rx_MPDU_Cnt represents the third number.

The noisy level determination unit U11 may further include a second determination unit U115, configured to: if the difference between the first number and the second number is less than the first threshold, determine the norm of the noisy level of the channel to be zero.

The apparatus may further include a searching unit U13, configured to: obtain the length of the aggregation frame which corresponds to the norm of the noisy level by searching a pre-determined mapping relation, where the mapping relation records relations between norms of the noisy level and lengths of aggregation frames.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for controlling length of aggregation frames in a wireless network, comprising:

obtaining a noisy level of a channel based on the number of first data received by a first terminal in a first period, where the first terminal is a station (STA) or an access point (AP) in the wireless network, and the first data comprise aggregation frames or non-aggregation frames; and determining length of an aggregation frame to be transmitted by the first terminal in a second period based on the noisy level of the channel, where the second period is following and adjacent to the first period along a time axis, wherein the noisy level of the channel decreases with the increment of a first ratio calculated based on Equation (1), $$A = C/B \quad (1),$$

where A represents the first ratio, B represents the number of the first data received by the first terminal in the first period, and C represents the number of a portion of the first data received by the first terminal in the first period, where a MAC target address of the portion of the first data is the first terminal.

2. The method according to claim 1, wherein the length of the aggregation frame decreases with the increment of the noisy level of the channel.

3. The method according to claim 1, wherein the noisy level of the channel is determined based on a norm of the noisy level of the channel, and the norm of the noisy level of the channel is determined by:

obtaining a first number, where the first number represents the number of physical layer protocol data units (PPDUs) received by the first terminal in the first period;

obtaining a second number, where the second number represents the number of Acknowledgement (ACK) frames or block ACK frames received by the first terminal in the first period;

obtaining a third number, where the third number represents the number of the first data received by the first terminal in the first period which are not ACK frames or block ACK frames and whose MAC target address is the first terminal; and if the difference between the first number and the second number is greater than or equal to a first threshold, determining the norm of the noisy level of the channel based on Equation (2), $$CCA\_Freq = 1 - \frac{Rx\_MPDU\_Cnt}{Rx\_PPDU\_Cnt - Rx\_ACK\_Cnt} \quad (2)$$

where CCA_Freq represents the norm of the noisy level of the channel, Rx_PPDU_Cnt represents the first number, Rx_ACK_Cnt represents the second number, and Rx_MPDU_Cnt represents the third number.

4. The method according to claim 3, further comprising: if the difference between the first number and the second number is less than the first threshold, determining the norm of the noisy level of the channel to be zero.

5. The method according to claim 4, wherein determining the length of the aggregation frame comprises: obtaining the length of the aggregation frame which corresponds to the norm of the noisy level by searching a pre-determined mapping relation, where the mapping relation records relations between norms of the noisy level and lengths of aggregation frames.

6. The method according to claim 3, wherein the first threshold is within a range from 1 to 10.

7. The method according to claim 4, wherein the first threshold is within a range from 1 to 10.

8. The method according to claim 3, wherein determining the length of the aggregation frame comprises: obtaining the length of the aggregation frame which corresponds to the norm of the noisy level by searching a pre-determined mapping relation, where the mapping relation records relations between norms of the noisy level and lengths of aggregation frames.

9. The method according to claim 1, wherein the first period and the second period are within a range from 100 ms to 500 ms.

10. The method according to claim 1, wherein the length of the aggregation frame is the number of aggregation sub-frames which constitute the aggregation frame.

11. The method according to claim 1, wherein the aggregation frame is one selected from aggregation-media access control protocol data unit (A-MPDU), aggregation-media access control service data unit (A-MSDU) or a combined aggregation frame, where the combined aggregation frame is a multi-level aggregation frame consisting of media access control protocol data unit (MPDU) and media access control service data unit (MSDU).

12. An apparatus for controlling length of aggregation frames in a wireless network, comprising:

a noisy level determination unit, configured to obtain a noisy level of a channel based on the number of first data received by a first terminal in a first period, where the first terminal is a station (STA) or an access point (AP) in the wireless network, and the first data comprise aggregation frames or non-aggregation frames; and an aggregation length determination unit, configured to determine length of an aggregation frame to be transmitted by the first terminal in a second period based on the noisy level of the channel, where the second period is following and adjacent to the first period along a time axis, wherein the noisy level of the channel decreases with the increment of a first ratio calculated based on Equation (1), $$A = C/B \quad (1),$$

where A represents the first ratio, B represents the number of the first data received by the first terminal in the first period, and C represents the number of a portion of the first data received by the first terminal in the first period, where a MAC target address of the portion of the first data is the first terminal.

13. The apparatus according to claim 12, wherein the length of the aggregation frame decreases with the increment of the noisy level of the channel.

14. The apparatus according to claim 12, wherein the noisy level determination unit is configured to determine the noisy level of the channel based on a norm of the noisy level of the channel, and comprises:

a physical layer protocol data unit (PPDU) statistic unit, configured to: obtain a first number, where the first number represents the number of PPDUs received by the first terminal in the first period;

an Acknowledgement (ACK) statistic unit, configured to: obtain a second number, where the second number represents the number of ACK frames or block ACK frames received by the first terminal in the first period a first data statistic unit, configured to: obtain a third number, where the third number represents the number of the first data received by the first terminal in the first period which are not ACK frames or block ACK frames and whose MAC target address is the first terminal; and a first determination unit, configured to: if the difference between the first number and the second number is greater than or equal to a first threshold, determine the norm of the noisy level of the channel based on Equation (2), $$CCA\_Freq = 1 - \frac{Rx\_MPDU\_Cnt}{Rx\_PPDU\_Cnt - Rx\_ACK\_Cnt} \quad (2)$$

where CCA_Freq represents the norm of the noisy level of the channel, Rx_PPDU_Cnt represents the first number, Rx_ACK_Cnt represents the second number, and Rx_MPDU_Cnt represents the third number.

15. The apparatus according to claim 14, wherein the noisy level determination unit further comprises a second determination unit, configured to: if the difference between the first number and the second number is less than the first threshold, determine the norm of the noisy level of the channel to be zero.

16. The apparatus according to claim 15, wherein the apparatus further comprises a searching unit, configured to: obtain the length of the aggregation frame which corresponds to the norm of the noisy level by searching a pre-determined mapping relation, where the mapping relation records relations between norms of the noisy level and lengths of aggregation frames.

17. The apparatus according to claim 14, wherein the apparatus further comprises a searching unit, configured to: obtain the length of the aggregation frame which corresponds to the norm of the noisy level by searching a pre-determined mapping relation, where the mapping relation records relations between norms of the noisy level and lengths of aggregation frames.

* * * * *